(12) United States Patent
Kurose et al.

(10) Patent No.: US 7,607,162 B2
(45) Date of Patent: Oct. 20, 2009

(54) BROADCASTING RECEIVER

(75) Inventors: Takahiro Kurose, Daito (JP); Toshihiro Takagi, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 450 days.

(21) Appl. No.: 11/455,758

(22) Filed: Jun. 20, 2006

(65) Prior Publication Data
US 2006/0285023 A1    Dec. 21, 2006

(30) Foreign Application Priority Data
Jun. 20, 2005    (JP)    ............................. 2005-179442

(51) Int. Cl.
*H04N 7/173* (2006.01)
(52) U.S. Cl. .................................... 725/131
(58) Field of Classification Search ........................ None
See application file for complete search history.

(56) References Cited

U.S. PATENT DOCUMENTS

| | | | | |
|---|---|---|---|---|
| 5,652,628 A * | 7/1997 | Toyoshima et al. | ........... | 725/56 |
| 6,766,526 B1 * | 7/2004 | Ellis | .............. | 725/57 |
| 6,775,843 B1 * | 8/2004 | McDermott | ................. | 725/151 |
| 2005/0100053 A1 * | 5/2005 | Kang | ......................... | 370/486 |

FOREIGN PATENT DOCUMENTS

| | | |
|---|---|---|
| JP | 2003-143435 A | 5/2003 |
| JP | 2003-153102 A | 5/2003 |
| JP | 2004-200866 A | 7/2004 |

* cited by examiner

*Primary Examiner*—John W Miller
*Assistant Examiner*—Oschta Montoya
(74) *Attorney, Agent, or Firm*—Crowell & Moring LLP (57) ABSTRACT

Discloses is a broadcasting receiver including: a receiver; a broadcast program output unit; a channel storage unit to store a physical channel correlated to a first virtual channel, the first virtual channel being composed of a first main channel number and a first sub-channel number; a virtual channel acquisition unit to acquire a second virtual channel from the broadcast signal received by the receiver, the second virtual channel being composed of a second main channel number and a second sub-channel number; a virtual channel comparison unit to compare the first virtual channel with the second virtual channel; a storage control unit to allow the channel storage unit to store the second virtual channel in replacement of the first virtual channel, when the virtual channel comparison unit judges that one of the first and second main channel numbers and the first and second sub-channel numbers are different from each other.

5 Claims, 12 Drawing Sheets

BROADCASTING RECEIVER

BACKGROUND OF THE INVENTION

1. Field of the Invention

The present invention relates to a broadcasting receiver.

2. Description of Related Art

Conventionally, information media capable of reception by a broadcasting receiver such as a TV set includes analog broadcasting, BS digital broadcasts, CS digital broadcasting and cable broadcast. In recent years, terrestrial digital broadcasting also is included and the number of channels capable of reception increasingly grows, so that it becomes possible for users to select a favorite channel from a variety of broadcastings and to enjoy a broadcast program of the selected channel.

Further, in a channel in digital broadcastings, for example, a plurality of virtual channels including a main channel and a sub-channel are hierarchically provided corresponding to a physical channel, so that various contents can be sent. The configuration of the virtual channel varies according to the broadcasting time band, and by way of example, FIG. 12 shows the configuration of the virtual channel in a time band (8:00 p.m. to 12:00 p.m.) of the physical channel "2".

Figure 12:
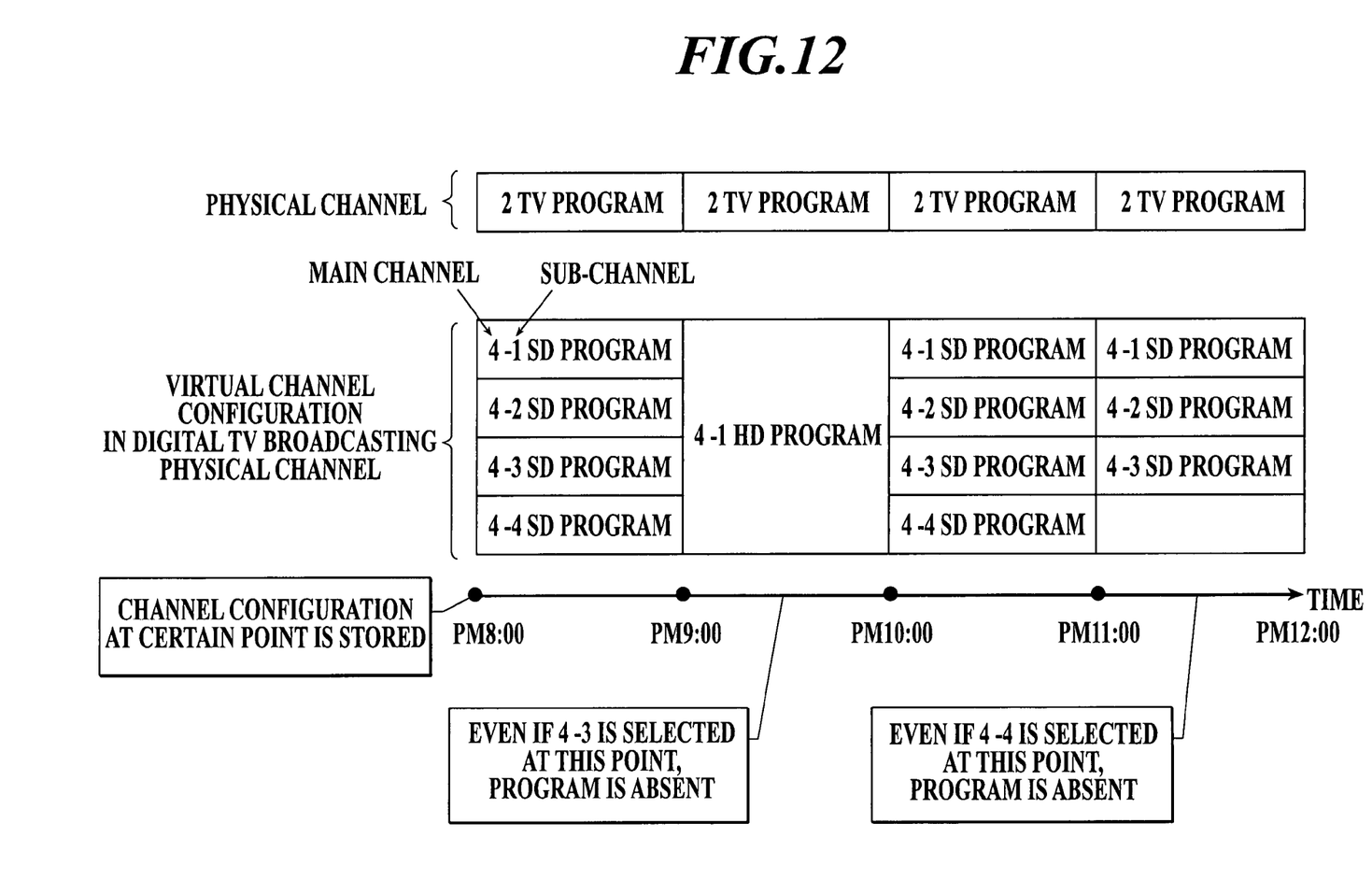
FIG. 12 is an explanatory view showing a channel configuration of digital broadcasting received by a broadcasting receiver.

As shown in FIG. 12, in the physical channel "2"; at 8:00 p.m. to 9:00 p.m., the virtual channels "4-1" to "4-4" are broadcasted; at 9:00 p.m. to 10:00 p.m., the virtual channel "4-1"; at 10:00 p.m. to 11:00 p.m., the virtual channels "4-1" to "4-4"; and at 11:00 p.m. to 12:00 p.m., the virtual channels "4-1" to "4-3". The SD (Standard Definition) programs broadcasted by the channels "4-1" to "4-4" are those of the digital broadcasting; the HD (High Definition) programs broadcasted from the channel "4-1" are those of the digital broadcasting.

Further, there is known a technology of allowing users to allocate a favorite channel frequently viewed from among a number of channels to a ten key on a remote controller of a broadcasting receiver and to switch to a program corresponding to the favorite channel by the operation of depressing the ten key (see, e.g., JP 2004-200866A and 2003-143435A).

Further, there is known a technology of allowing users to more rapidly select a desired channel from among a number of channels in a broadcasting receiver (see, e.g., JP 2003-153102A).

However, the conventional technologies have a problem that when a channel number corresponding to a predetermined program is changed for the purpose of a channel content update in a broadcasting station side, its original channel number disappears, and as a result, it sometimes becomes impossible for the broadcasting receiver side to switch to the predetermined program by the operation of the remote controller.

Specifically, when the virtual channel "4-1" is changed to the channel "6-1" by the channel content update in the broadcasting station side, the physical channel "2" and the virtual channel cannot be made to correspond to each other in the broadcasting receiver side, and as a result, it sometimes becomes impossible for the broadcasting receiver side to switch programs in response to the physical channel "2".

SUMMARY OF THE INVENTION

It is an object of the present invention to provide a broadcasting receiver capable of reflecting on a broadcasting receiver side a change of a channel number in a broadcasting station side.

In order to solve the above-described problem, according to a first aspect of the invention, a broadcasting receiver comprises: receiver to receive a broadcast signal of a broadcast program; a broadcast program output unit to broadcast a broadcast program in response to the broadcast signal received by the receiver; a channel storage unit to store a physical channel correlated to a first virtual channel, the first virtual channel being composed of a first main channel number to specify a broadcast signal of a predetermined broadcast program and a first sub-channel number to perform multiple delivery of broadcast signals of broadcast programs having different broadcast contents each other, the physical channel corresponding to a frequency band of the broadcast signal of the broadcast program; a virtual channel acquisition unit to acquire a second virtual channel from the broadcast signal which is correlated to the physical channel and is received by the receiver, the second virtual channel being composed of a second main channel number and a second sub-channel number; a virtual channel comparison unit to compare the first virtual channel correlated to the physical channel with the second virtual channel; a storage control unit to allow the channel storage unit to store the second main channel number in replacement of the first main channel number, when the virtual channel comparison unit judges that the second sub-channel number is the same as the first sub-channel number and the second main channel number is different from the second main channel number; a channel selection device including a channel key corresponding to the physical channel, to switch the physical channel so that the broadcast program output unit broadcasts a broadcast program corresponding the first virtual channel correlated to the physical channel when the channel key is operated; a channel display control unit to allow the broadcast program output unit to display a channel number indicating the first virtual channel of the channel key in an arrangement corresponding to an arrangement of the channel key on the channel selection device; a display deletion control unit to delete the channel number displayed on the broadcast program output unit by the channel display control unit when a predetermined time is lapse; and a display extension control unit to extend a display time of the channel number for a predetermined time, when the channel key is operated while the channel number is displayed on the broadcast program output unit.

Thus, the broadcasting receiver receives the broadcasting signal corresponding to the physical channel, and compares the first virtual channel stored in the channel storage unit and correlated with the physical channel with the second virtual channel attached to the received broadcasting signal acquired by the channel acquisition unit. When it is judged that the second sub-channel number is the same as the first sub-channel number and the second main channel number is different from the second main channel number, the first main channel number is replaced with the second main channel number so that the channel storage unit stores the second virtual channel as a new first virtual channel by updating the first virtual channel.

That is, even if a virtual channel corresponding to a predetermined broadcast program is changed for the purpose of the channel content update in the broadcasting station side, a virtual channel having a sub-channel number as a part of the original virtual channel can be updated and stored as a new virtual channel. Therefore, even if a main channel number of the virtual channel is changed in the broadcasting station side, a manual work for users to store and re-register the changed virtual channel in the broadcasting receiver is not required.

Consequently, it can be said that the broadcasting receiver is a broadcasting receiver capable of reflecting on the broadcasting receiver side a change of the channel number in response to the channel content update in the broadcasting station side.

Further, the broadcasting receiver display on the broadcasting program output unit a channel number indicating the first virtual channel of the channel key in an arrangement corresponding to an arrangement of the channel key on the channel selection device.

Consequently, in the broadcasting receiver, a channel number displayed on the broadcast program output unit can be viewed and confirmed and at the same time, a broadcast program corresponding to a favorite channel (physical channel, virtual channel) allocated to and registered on a channel key can be selected by the channel selection device and therefore, a channel selection of a desired broadcast program can be easily performed.

Further, the broadcasting receiver can delete the channel number displayed on the broadcast program output unit when a predetermined time is lapse, and can extend a display time of the channel number for a predetermined time, when the channel key is operated while the channel number is displayed on the broadcast program output unit.

That is, the broadcasting receiver can delete, after a predetermined time, the channel number displayed on the broadcast program output unit. Further, the broadcasting receiver, when the channel key is selectively operated while the channel number is displayed on the broadcast program output unit, can extend the display time of the channel number for a predetermined time and therefore, an operation of switching channels can be easily performed continuously by reference to the displayed channel number.

According to a second aspect of the invention, a broadcasting receiver comprises: receiver to receive a broadcast signal of a broadcast program; a broadcast program output unit to broadcast a broadcast program in response to the broadcast signal received by the receiver; a channel storage unit to store a physical channel correlated to a first virtual channel, the first virtual channel being composed of a first main channel number to specify a broadcast signal of a predetermined broadcast program and a first sub-channel number to perform multiple delivery of broadcast signals of broadcast programs having different broadcast contents each other, the physical channel corresponding to a frequency band of the broadcast signal of the broadcast program; a virtual channel acquisition unit to acquire a second virtual channel from the broadcast signal which is correlated to the physical channel and is received by the receiver, the second virtual channel being composed of a second main channel number and a second sub-channel number; and a virtual channel comparison unit to compare the first virtual channel correlated to the physical channel with the second virtual channel; a storage control unit to allow the channel storage unit to update the first virtual channel by storing the second virtual channel in replacement of the first virtual channel, when the virtual channel comparison unit judges that one of the first and second main channel numbers and the first and second sub-channel numbers are different from each other.

Thus, the broadcasting receiver receives the broadcasting signal corresponding to the physical channel, and compares the first virtual channel stored in the channel storage unit and correlated with the physical channel with the second virtual channel attached to the received broadcasting signal acquired by the channel acquisition unit. When it is judged that one of the first and second main channel numbers and the first and second sub-channel numbers are different from each other, the first main channel number is replaced with the second main channel number so that the channel storage unit stores the second virtual channel as a new first virtual channel by updating the first virtual channel.

That is, even if a virtual channel corresponding to a predetermined broadcast program is changed for the purpose of the channel content update in the broadcasting station side, a virtual channel having a main channel number or sub-channel number as a part of the original virtual channel can be updated and stored as a new virtual channel. Therefore, even if the virtual channel is changed in the broadcasting station side, a manual work for users to store and re-register the changed virtual channel in the broadcasting receiver is not required.

Consequently, it can be said that the broadcasting receiver is a broadcasting receiver capable of reflecting on the broadcasting receiver side a change of the channel number in response to the channel content update in the broadcasting station side.

Preferably, the broadcasting receiver further comprises: a channel selection device including a channel key corresponding to the physical channel, to switch the physical channel so that the broadcast program output unit broadcasts a broadcast program corresponding the first virtual channel correlated to the physical channel when the channel key is operated; and a channel display control unit to allow the broadcast program output unit to display a channel number indicating the first virtual channel of the channel key in an arrangement corresponding to an arrangement of the channel key on the channel selection device.

Thus, the broadcasting receiver display on the broadcasting program output unit a channel number indicating the first virtual channel of the channel key in an arrangement corresponding to an arrangement of the channel key on the channel selection device.

Consequently, in the broadcasting receiver, a channel number displayed on the broadcast program output unit is viewed and confirmed as well as a broadcast program corresponding to a favorite channel (physical channel, virtual channel) allocated to and registered on a channel key can be selected by the channel selection device and therefore, a channel selection of a desired broadcast program can be easily performed.

Preferably, the broadcasting receiver further comprises: display deletion control unit to delete the channel number displayed on the broadcast program output unit by the channel display control unit when a predetermined time is lapse; and a display extension control unit to extend a display time of the channel number for a predetermined time, when the channel key is operated while the channel number is displayed on the broadcast program output unit.

Thus, the broadcasting receiver can delete the channel number displayed on the broadcast program output unit when a predetermined time is lapse, and can extend a display time of the channel number for a predetermined time, when the channel key is operated while the channel number is displayed on the broadcast program output unit.

That is, the broadcasting receiver can delete, after a predetermined time, the channel number displayed on the broadcast program output unit. Further, the broadcasting receiver, when the channel key is selectively operated while the channel number is displayed on the broadcast program output unit, can extend the display time of the channel number for a predetermined time. Therefore, an operation for switching channels can be easily performed continuously by reference to the displayed channel number.

BRIEF DESCRIPTION OF THE DRAWINGS

The present invention will become more fully understood from the detailed description given hereinbelow and the appended drawings which given by way of illustration only, and thus are not intended as a definition of the limits of the present invention, and wherein.

DETAILED DESCRIPTION OF THE INVENTION

Embodiments of a broadcasting receiver according to the present invention will be described in detail below by referring to drawings. In the present embodiment, a TV broadcast receiver (hereinafter, referred to as a broadcasting receiver) as a broadcasting receiver and a remote controller as a channel selection device of the broadcasting receiver will be described.

Figure 1:
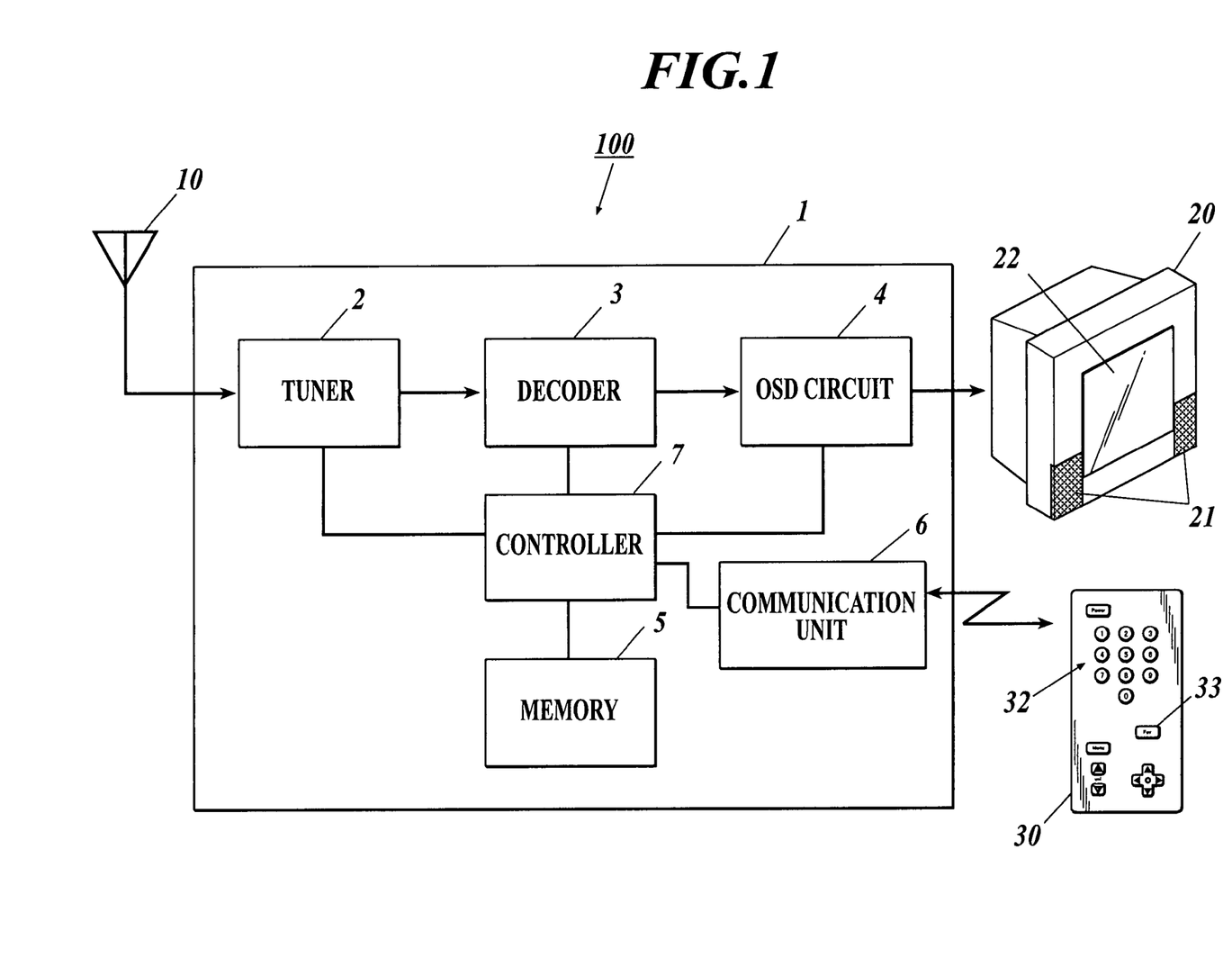
FIG. 1 is a block diagram showing an essential structure of a broadcasting receiver according to the present invention.
Figure 2:
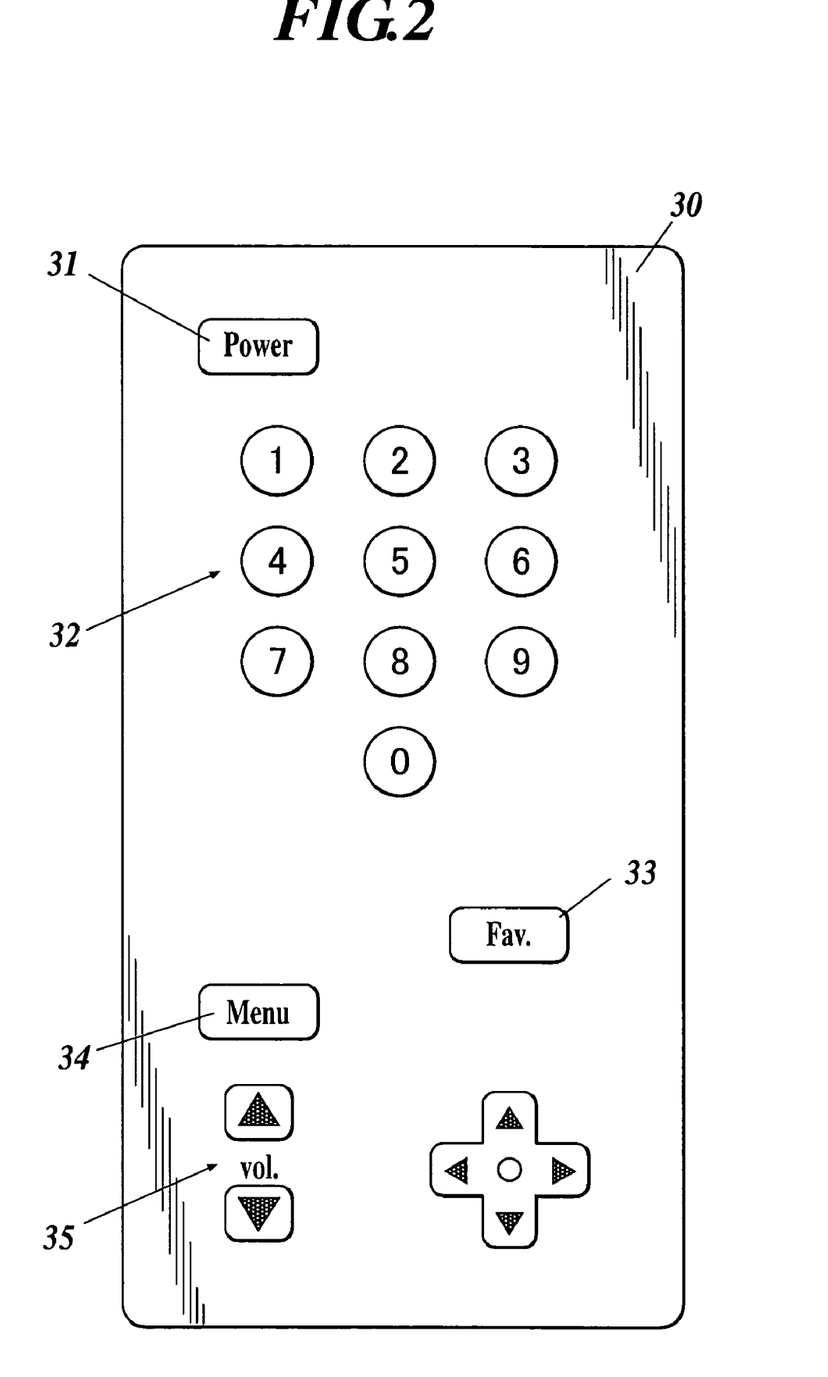
FIG. 2 is a plan view of a remote controller according to the present invention.

FIG. 1 is a block diagram showing an essential structure of a broadcasting receiver 100 according to the present invention and FIG. 2 is a plan view of a remote controller 30.

As shown in FIG. 1, the broadcasting receiver 100 comprises a receiver main body 1 which receives broadcast signals, a display device 20 as a broadcast program output unit which outputs images or voices based on the broadcast signals received by the receiver main body 1 and broadcasts a broadcast program, and a remote controller 30 which switches programs by selecting a channel made to correspond to the broadcast program in response to the broadcast signal received by the receiver main body 1.

As shown in FIG. 1, the receiver main body 1 has a tuner 2 as a receiver which receives through an antenna 10 a broadcast signal present in a frequency band corresponding to a desired channel, a decoder 3 which decodes the broadcast signal received by the tuner 2, an OSD circuit 4 which provides a predetermined on-screen display (hereinafter, referred to as an OSD) on the display device 20, a memory 5 which stores originating frequencies of each channel corresponding to each broadcast signal or channel configuration information, a communication unit 6 which establishes communication with the remote controller 30, and a controller 7 including a CPU which controls the respective units of the broadcasting receiver 100. The receiver main body 1 may have an operation button group capable of the same input operation as in the remote controller 30.

The antenna 10 receives a coded broadcast signal of a radio frequency (RF) transmitted from a TV broadcasting station.

The tuner 2 is supplied with the broadcast signal received through the antenna 10 and performs a channel selection processing in response to a channel selection instruction inputted from the remote controller 30 by users to thereby receive a broadcast signal present in a frequency band corresponding to a selected channel, modulate the broadcast signal into an intermediate frequency (IF) signal and then output the signal to the decoder 3.

That is, the tuner 2 performs a channel selection processing of selecting from among a plurality of receivable broadcast signals for a multi-channel broadcasting a broadcast signal in response to a channel inputted from the remote controller 30 to thereby switch broadcast programs.

The decoder 3 decodes the broadcast signal received by the tuner 2.

By the instruction from the controller 7, the OSD circuit 4 outputs the broadcast signal decoded by the decoder 3 to the display device 20 as well as outputs an OSD display signal for allowing the display unit 20 to display a predetermined list (OSD display) related to receivable channel information.

The memory 5 stores the information on the frequency band of each channel or the channel configuration information, and stores the information on the OSD display displayed on the display device 20.

Particularly, the memory 5 serves as a channel storage unit which stores a physical channel correlated to a virtual channel, in which the virtual channel is composed of a main channel number given to specify a broadcast signal of a predetermined broadcast program and a sub-channel number given to multiplex and deliver broadcast signals of broadcast programs having different broadcast contents in connection with the predetermined broadcast programs, and the physical channel is given to correspond to a frequency band of the broadcast signal of the broadcast program.

For example, the memory 5 as the channel storage unit stores a physical channel and a virtual channel (a main channel number-a sub-channel number) in relation to each other, such as "physical channel-main channel number-sub-channel number; P-M-S".

Further, the memory 5 stores a physical channel (virtual channel) allocated to a channel key such as a ten key 32 provided on the after-mentioned remote controller 30.

The communication unit 6 transmits and receives predetermined signals to and from the remote controller 30, whereby various data is given and received between the receiver main body 1 and the remote controller 30.

For example, the communication unit 6 receives a channel selection signal transmitted from the remote controller 30 for switching broadcast programs or a channel display signal for allowing the display unit 20 to display a channel-related OSD display, and transmits the various received signals to the controller 7.

The controller 7 receives an input operation by users using the remote controller 30 to control the respective units of the broadcasting receiver 100 through a Data-Bus.

Further, the controller 7 executes control, based on the input of a channel selection instruction by the operation by users of a channel key (ten key 32) on the remote controller 30, for allowing the tuner 2 to receive a broadcast signal corresponding to the channel, allowing the decoder 3 to decode the received broadcast signal as well as allowing the OSD circuit 4 to output the decoded signal to the display device 20 to thereby broadcast the broadcast program. That is, the controller 7 executes control, based on the input of a channel selection signal transmitted from the remote controller 30 for switching the broadcast programs, for switching the channels (physical channel (virtual channel)) to thereby switch the broadcast programs.

Further, the controller 7 serves as a virtual channel acquisition unit which receives a broadcast signal made to correspond to a physical channel through the antenna 10 or the tuner 2 and obtains a virtual channel given to the broadcast signal.

Further, the controller 7 serves as a virtual channel comparison unit which compares a virtual channel obtained by the controller 7 as the virtual channel acquisition unit with a virtual channel correlated to a physical channel stored in the memory 5.

The controller 7 serves as a storage control unit which, when, as a result of comparing the virtual channels by the controller 7 as the virtual channel comparison unit, any one of main channel numbers and sub-channel numbers in the virtual channels is different, updates as a new virtual channel a virtual channel obtained by the controller 7 as the virtual channel acquisition unit and allows the memory 5 to store the updated virtual channel.

Further, the controller 7 may serve as a storage control unit which, when, as a result of comparing the virtual channels by the controller 7 as the virtual channel comparison unit, a sub-channel number in the virtual channel obtained by the controller 7 as the virtual channel acquisition unit is the same as that stored in the memory 5 as well as a main channel number in the virtual channel obtained by the controller 7 as the virtual channel acquisition unit is different from that stored in the memory 5, allocates and substitutes the main channel number in the virtual channel obtained by the controller 7 as the virtual channel acquisition unit for the main channel number in the virtual channel stored in the memory 5 and allows the memory 5 to store the obtained virtual channel.

Further, the controller 7 serves as a channel display control unit which allows the display unit 20 to OSD display, in relation to the arrangement of the ten key 32 provided on the after-mentioned remote controller 30, a channel number indicating a physical channel or virtual channel as a favorite channel made to correspond to the ten key 32.

For example, the controller 7 executes control, based on the input of a channel display signal by the operation by users of a favorite program key (Fav. key) 33 on the remote controller 30, for allowing the display device 20 to OSD display a channel number.

Further, the controller 7 serves as a display deletion control unit which deletes, after a predetermined time, the display of the channel number displayed on the display device 20 by the controller 7 as the channel display control unit.

Further, the controller 7 serves as a display elongation control unit which, when the ten key 32 provided on the after-mentioned remote controller 30 is selectively operated while the display of a channel number is displayed on the display device 20, extend a display time of the channel number for a predetermined time.

As shown in FIG. 1, the display device 20 has a voice output unit 21 which outputs voices in response to voice data based on a broadcast signal received by the receiver main body 1 and an image display unit 22 which displays images in response to image data based on a broadcast signal.

The voice output unit 21 is, for example, a speaker device and outputs voices in response to voice data based on a broadcast signal received by the receiver main body 1. The image display unit 22 is, for example, a liquid crystal display device and displays images or screens in response to image data based on a broadcast signal received by the receiver main body 1.

The remote controller 30 is a device for inputting an operation instruction by users to the receiver main body 1, and is constructed so as to instruct, using infrared rays, operations of the receiver main body 1 and the display device 20.

As shown in FIG. 2, the remote controller 30 has, for example, a power key 31 which turns ON or OFF the power supplies of the receiver main body 1 and the display device 20, a ten key 32 as a channel key which selects a channel of the broadcasting receiver 100, a favorite program key 33 which calls on the display device 20, in relation to the arrangement of the ten key 32, the OSD display screen of the channel number indicating a physical channel or virtual channel made to correspond to the ten key 32, a menu key 34 which calls a menu screen for the broadcasting receiver 100, and a volume up/down key 35 which adjusts a sound volume of the broadcasting receiver 100 (display device 20).

Further, the remote controller 30 transmits, to the receiver main body 1, various signals by the depression and operation of each key.

For example, the remote controller 30, by the operation of the ten key 32, transmits to the communication unit 6 of the receiver main body 1 a channel selection signal in response to the ten key 32.

Further, the remote controller 30, by the operation of the favorite program key 33, transmits to the communication section 6 of the receiver main body 1 a channel display signal for allowing the display device 20 to display a channel-related OSD display.

Figure 3:
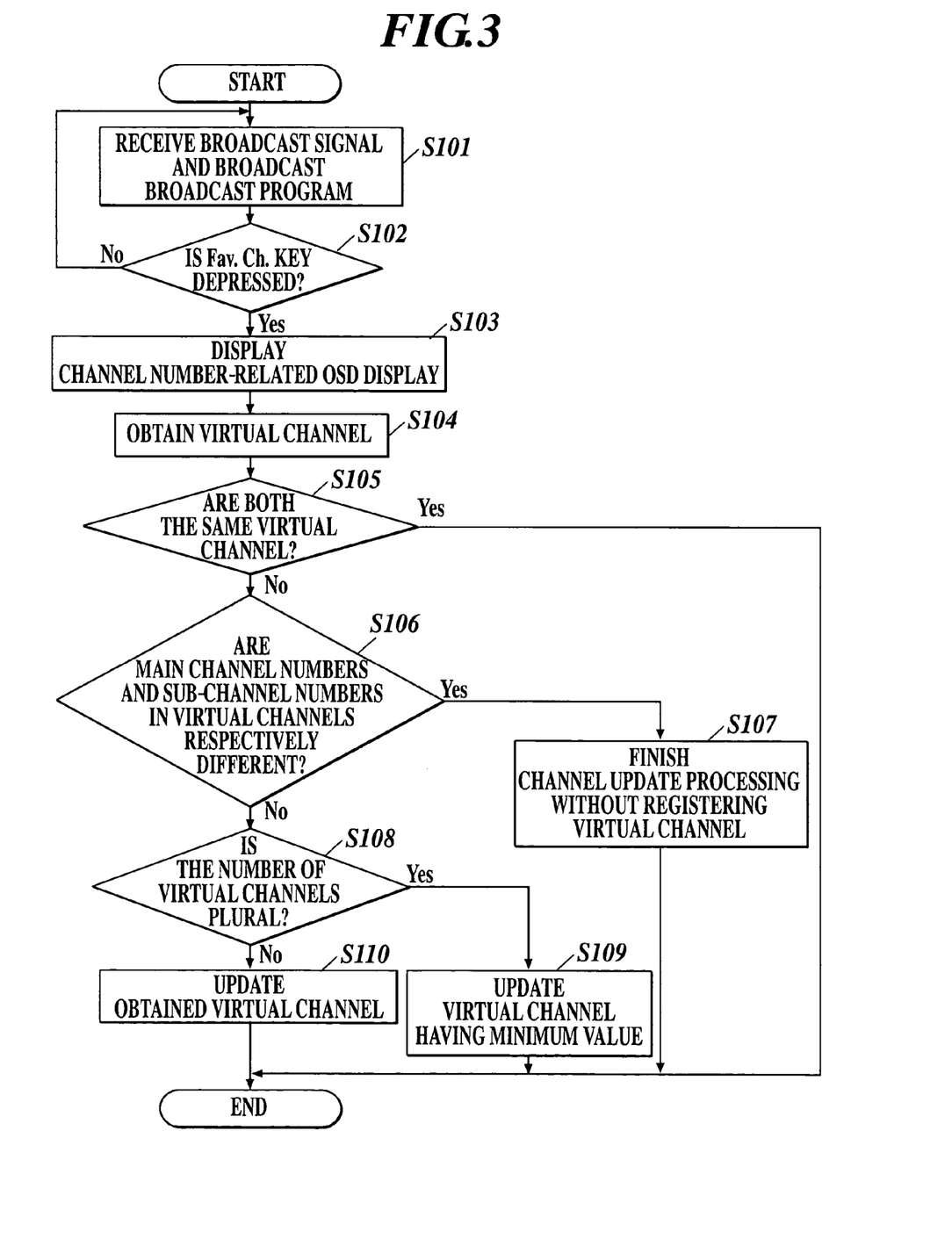
FIG. 3 is a flowchart showing a processing in which a broadcasting receiver changes a virtual channel made to correspond to a physical channel.

Next, with reference to the flowchart shown in FIG. 3, there will be described a processing in which when a virtual channel given to a broadcast signal received in the broadcasting receiver 100 is changed, the broadcasting receiver 100 changes the virtual channel made to correspond to the physical channel.

First, when the power supply of the broadcasting receiver 100 becomes on state, the broadcasting receiver 100 (receiver main body 1) receives a predetermined broadcast signal and broadcasts by the display device 20 a broadcast program in response to the broadcast signal (step S101).

Figure 4:
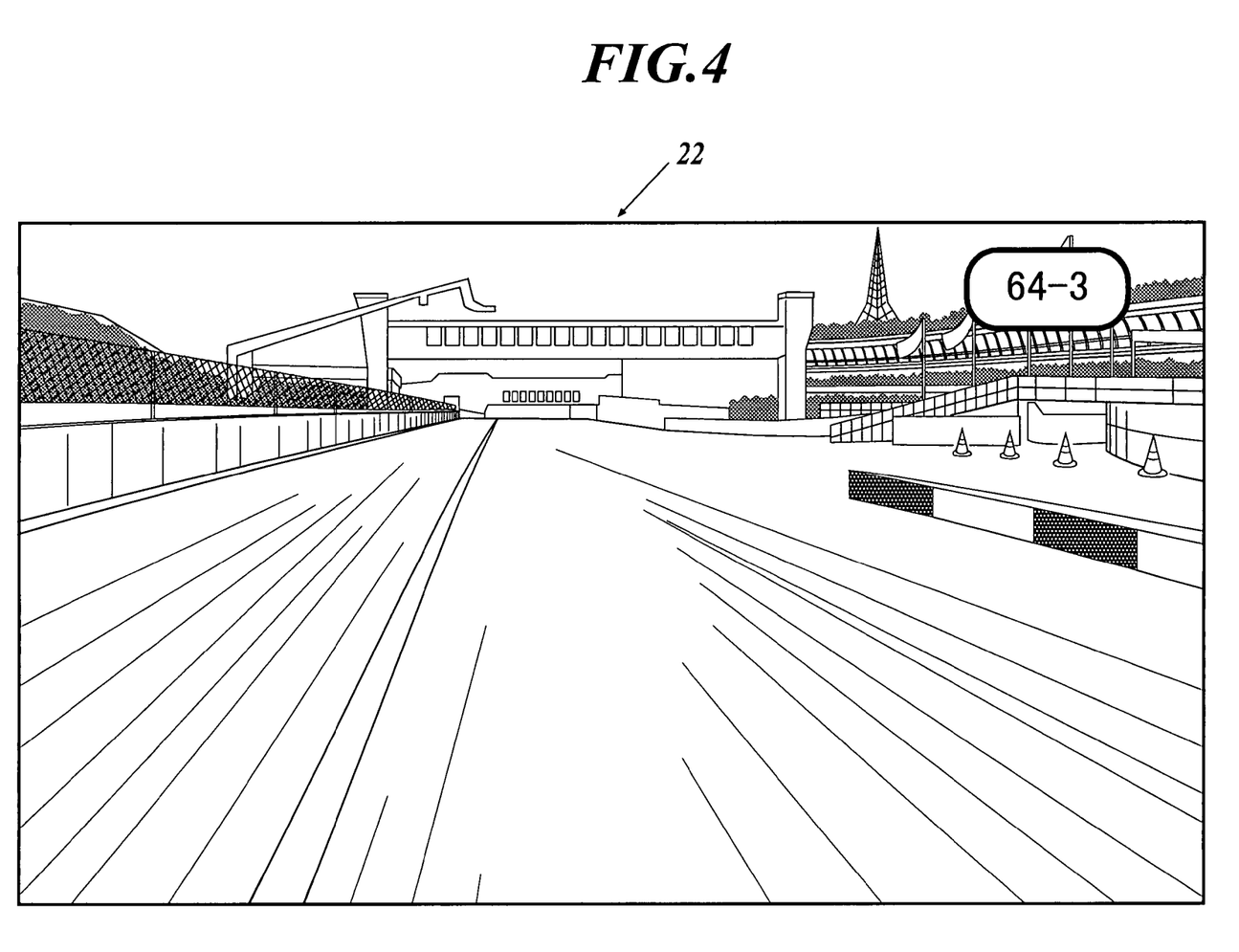
FIG. 4 is an explanatory view showing one example of a display screen in an image display unit of a display device.

For example, a broadcast program corresponding to a virtual channel "64-3" allocated to "9" of the ten key 32 is broadcasted and displayed on the image display unit 22 of the display device 20 shown in FIG. 4.

Next, when determining that the favorite program key (Fav. key) 33 on the remote controller 30 is depressed (step S102; Yes), the controller 7 allows the image display unit 22 of the display device 20 to display the channel number-related OSD display 22a as shown in FIG. 5 (step S103).

Figure 5:
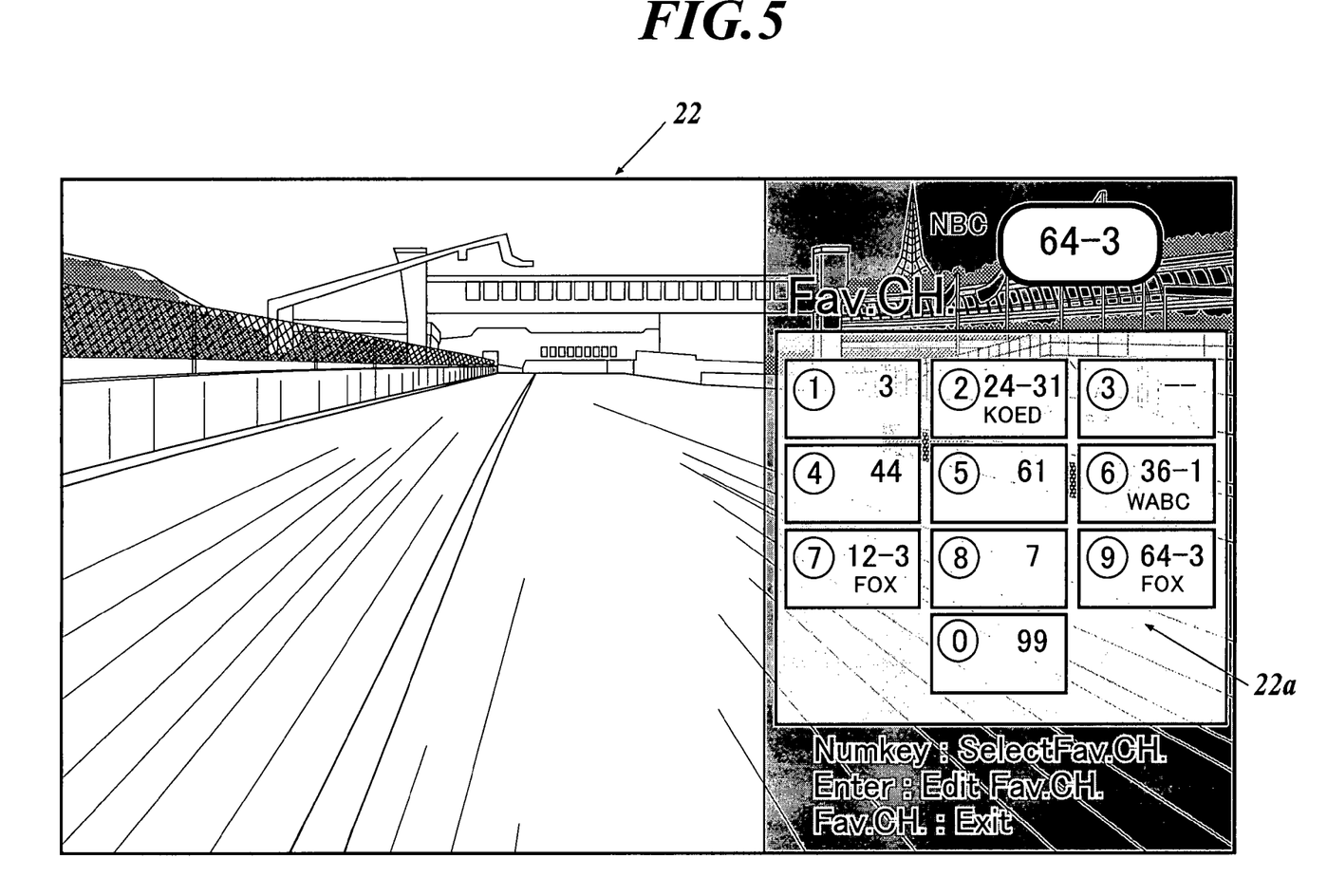
FIG. 5 is an explanatory view showing one example of a display screen in an image display unit of a display device.

As shown in FIG. 5, the OSD display 22a displays, in relation to the arrangement of the ten key 32 provided on the remote controller 30, the channel numbers (e.g., channel number "3" to ten key "1", channel number "24-31" to ten key "2" . . . ) of the physical channel or virtual channel made to correspond to the ten key 32. Further, as for the digital broadcast channel, the OSD display 22a displays the channel number as well as a broadcasting station name (e.g., KOED, WABC, FOX) as channel information.

Next, in the broadcasting receiver 100, the controller 7 receives a broadcast signal made to correspond to the physical channel allocated to the ten key 32 on the remote controller 30 as well as obtains a virtual channel given to the broadcast signal (step S104).

Herein, a case of obtaining a virtual channel correlated to a physical channel allocated to "6" of the ten key 32 will be described by way of example.

As displayed on a display area corresponding to "6" of the ten key 32 of the OSD display 22*a* shown in FIG. 5, for example, a virtual channel "36-1" is made to correspond to a physical channel "60" allocated to "6" of the ten key 32, and in the memory 5, a channel number is stored as in the format of "6; 60-36-1, ten key number; (P-M-S)".

Next, the controller 7 compares the virtual channel obtained in step S104 with that stored in the memory 5 and determines whether or not both are the same virtual channel (step S105).

When the controller 7 determines that the virtual channels are the same as well as the main channel numbers and the sub-channel numbers in the virtual channels are respectively the same (step S105; Yes), the update for changing the virtual channel is not required and therefore, the processing is finished without change.

On the other hand, when determining that the virtual channels are not the same (step S105; No), the controller 7 determines whether or not the main channel numbers and sub-channel numbers in the virtual channels are respectively different (step S106).

When determining that the main channel numbers and sub-channel numbers in the virtual channels are respectively different, (step S106; Yes), the controller 7 does not register the virtual channel on the physical channel "60" allocated to "6" of the ten key 32 (step S107), and the channel update processing is finished. That is, the virtual channel is not made to correspond to the physical channel 60 allocated to "6" of the ten key 32, and therefore, there is caused a state in which even if "6" of the ten key 32 on the remote controller 30 is operated, a broadcast program is not broadcasted.

In addition, when users make a desired virtual channel correspond by manual operations to the physical channel "60" allocated to "6" of the ten key 32, "6" of the ten key 32 on the remote controller 30 can be made effective with respective to the broadcasting of broadcasting programs.

On the other hand, when determining that any one of the main channel numbers and sub-channel numbers in the virtual channels is different (step S106; No), the controller 7 determines whether or not the number of the virtual channels obtained in step S104 is plural (step S108).

When determining that the number of the obtained virtual channels is plural (step S108; Yes), the controller 7 updates as a new virtual channel a virtual channel having a minimum value in the obtained virtual channels and stores the updated virtual channel in the memory 5 so as to make it correspond to "6" of the ten key 32 or to the physical channel "60" (step S109). Thus, the channel update processing is finished.

Specifically, when the obtained virtual channels are "47-1" and "51-1", the virtual channel "47-1" is updated as a new virtual channel and further, when the obtained virtual channels are "47-1" and "47-2", the virtual channel "47-1" is updated as a new virtual channel.

Figure 6:
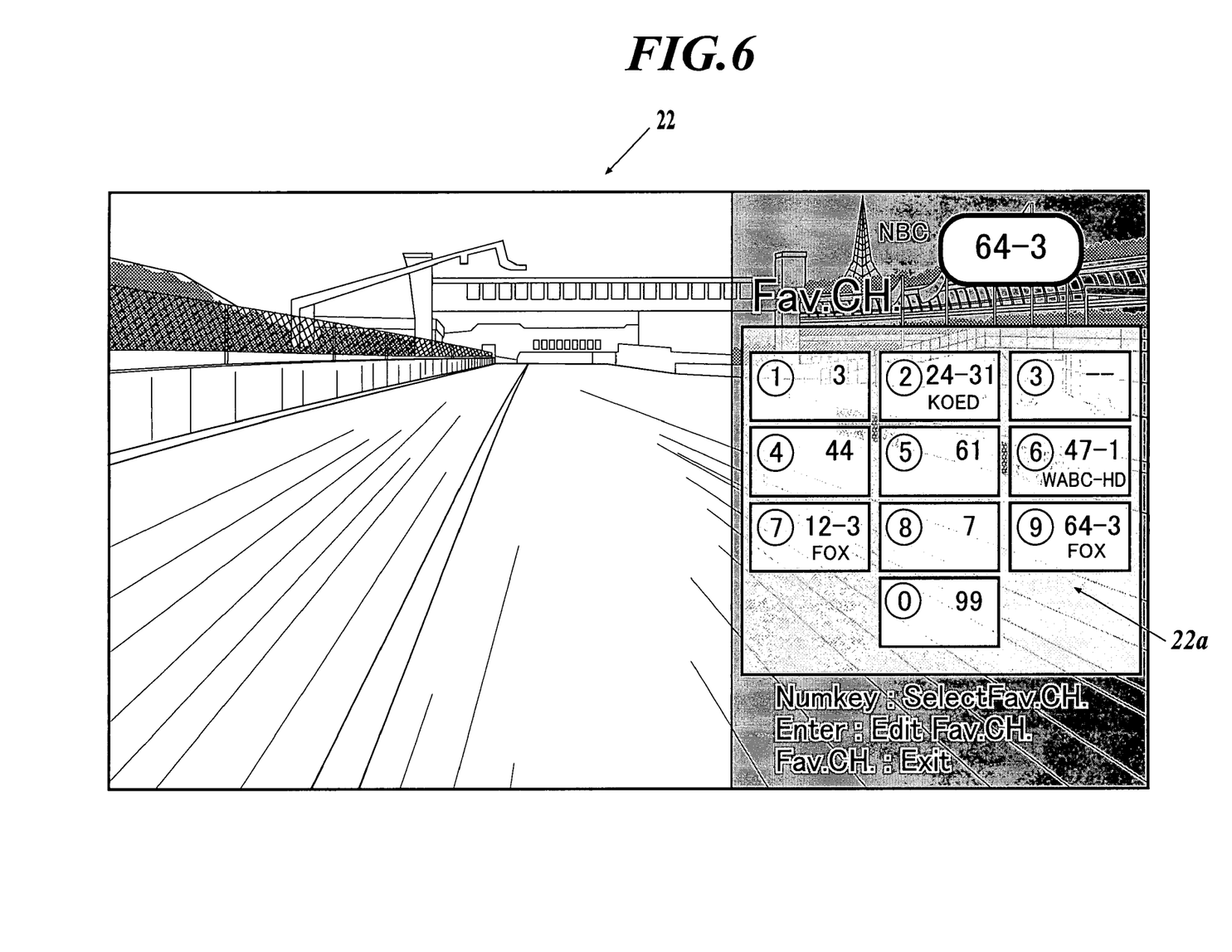
FIG. 6 is an explanatory view showing one example of a display screen in an image display unit of a display device.

Further, on the display area corresponding to "6" of the ten key 32 of the OSD display 22*a* shown in FIG. 6, the channel number "47-1" of a new updated virtual channel is displayed in place of the channel number "36-1".

When determining that the sub-channel number in the virtual channel obtained by the controller 7 as the virtual channel acquisition unit is the same as that stored in the memory 5 as well as the main channel number in the virtual channel obtained by the controller 7 as the virtual channel acquisition unit is different from that stored in the memory 5, the controller 7 may update the obtained virtual channel as a new virtual channel. In this case, when the obtained virtual channels are "47-1" and "47-2", the channel number "47-1" of a new updated virtual channel is displayed in place of the channel number "36-1".

On the other hand, when determining that the number of the obtained virtual channels is not plural but one (step S108; No), the controller 7 updates the obtained virtual channel "47-1" as a new virtual channel and stores the updated virtual channel in the memory 5 so as to make it correspond to "6" of the ten key 32 or to the physical channel "60" (step S110). Thus, the channel update processing is finished.

Further, on the display area corresponding to "6" of the ten key 32 of the OSD display 22*a* shown in FIG. 6, the channel number "47-1" of a new updated virtual channel is displayed in place of the channel number "36-1".

In the acquisition operation in step S104 of the virtual channel given to the broadcast signal made to correspond to the physical channel allocated to the ten key 32 on the remote controller 30, for example, when the ten key 32 has ten buttons from "0" to "9", the operation is repeated ten times to thereby obtain the virtual channel for each ten key.

As described above, the broadcasting receiver 100 according to the present invention receives a broadcast signal made to correspond to the physical channel allocated to the ten key 32 on the remote controller 30 as well as, when any one of the main channel number and sub-channel number in the virtual channel given to the broadcast signal is changed, can store and update the changed virtual channel as a new virtual channel.

That is, even if a virtual channel number corresponding to a predetermined broadcast program is changed for the purpose of the channel content update in the broadcasting station side, a virtual channel having a part of the original virtual channel number can be updated as a new virtual channel. Therefore, even if the virtual channel is changed in the broadcasting station side, the broadcasting receiver 100 can select a channel to switch broadcast programs by the operation of the ten key 32 on the remote controller 30.

Accordingly, when the virtual channel number corresponding to a predetermined broadcast program is changed in the broadcasting station side, a favorite channel (broadcast program) is automatically registered without being manually re-registered on the ten key 32 by users and therefore, the operation or handling thereof is facilitated.

Consequently, it can be said that the broadcasting receiver 100 is a broadcasting receiver capable of reflecting on the broadcasting receiver side a change of the channel number in response to the channel content update in the broadcasting station side.

Figure 7:
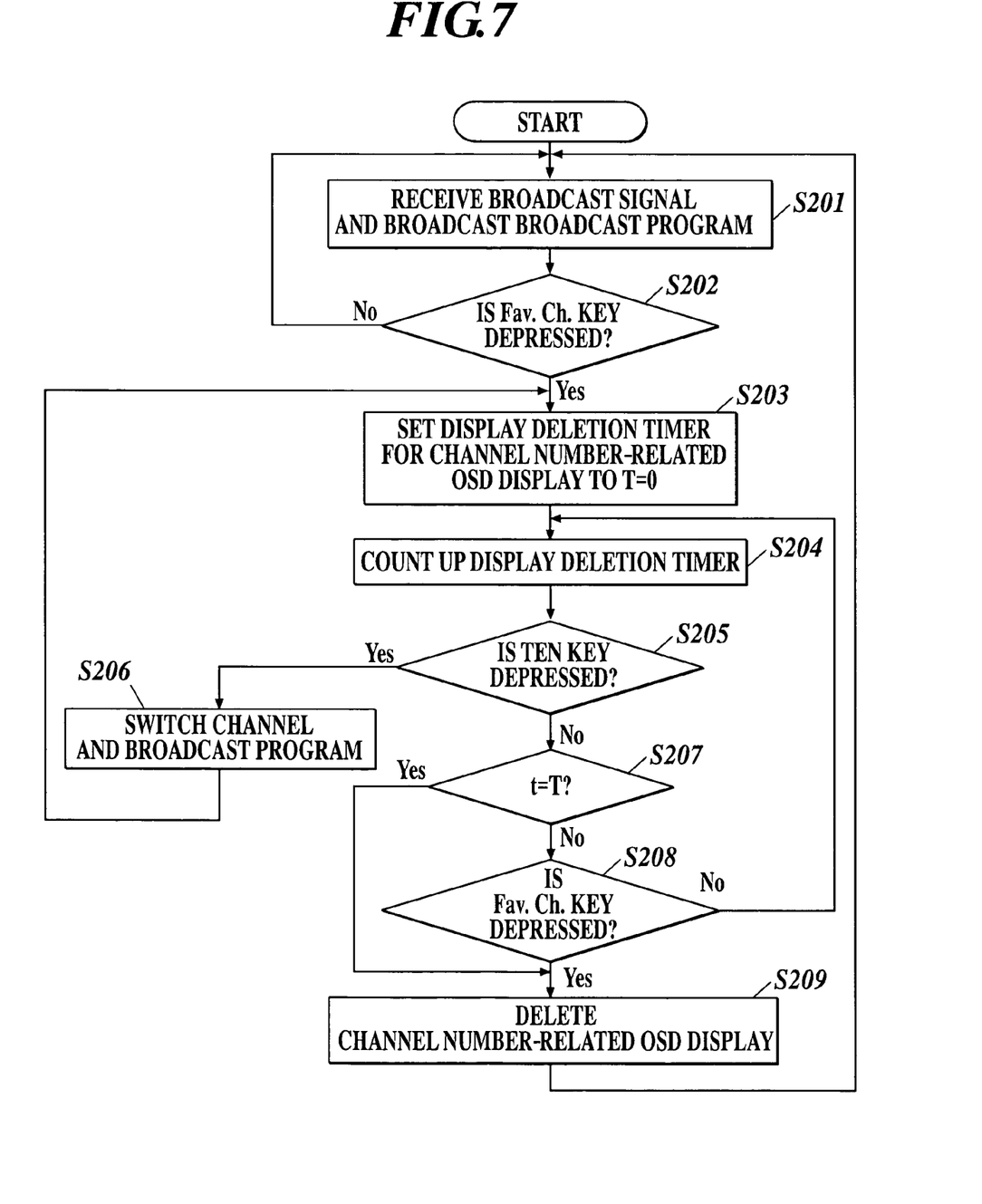
FIG. 7 is a flowchart showing a processing in which a broadcasting receiver switches channels or broadcast programs.

Next, a processing of switching channels or broadcast programs in the broadcasting receiver 100 will be described with reference to the flowchart shown in FIG. 7.

First, when the power supply of the broadcasting receiver 100 becomes on-state, the broadcasting receiver 100 (receiver main body 1) receives a predetermined broadcast signal and broadcasts by the display device 20 a broadcast program in response to the broadcast signal (step S201). For example, a broadcast program corresponding to a virtual channel "64-3" allocated to "9" of the ten key 32 is broadcasted and displayed on the image display unit 22 of the display device 20 shown in FIG. 4.

Next, when determining that the favorite program key (Fav. key) 33 on the remote controller 30 is depressed (step S202; Yes), the controller 7 allows the image display unit 22 of the display device 20 to display the channel number-related OSD display 22*a* as shown in FIG. 5 as well as sets to t=0 a display deletion timer for the OSD display (step S203).

Further, the controller 7 counts up the display deletion timer t for the OSD display (step S204).

Next, the controller 7 determines whether or not the ten key 32 on the remote controller 30 is depressed and the channel switching instruction is inputted (step S205).

When determining that the ten key 32 is depressed and the channel switching instruction is inputted (step S205; Yes), the controller 7 performs switching such that the broadcast program corresponding to the physical channel (virtual channel) made to correspond to the ten key 32 is broadcasted on the display device 20 (step S206), and the processing returns to step S203.

Figure 8:
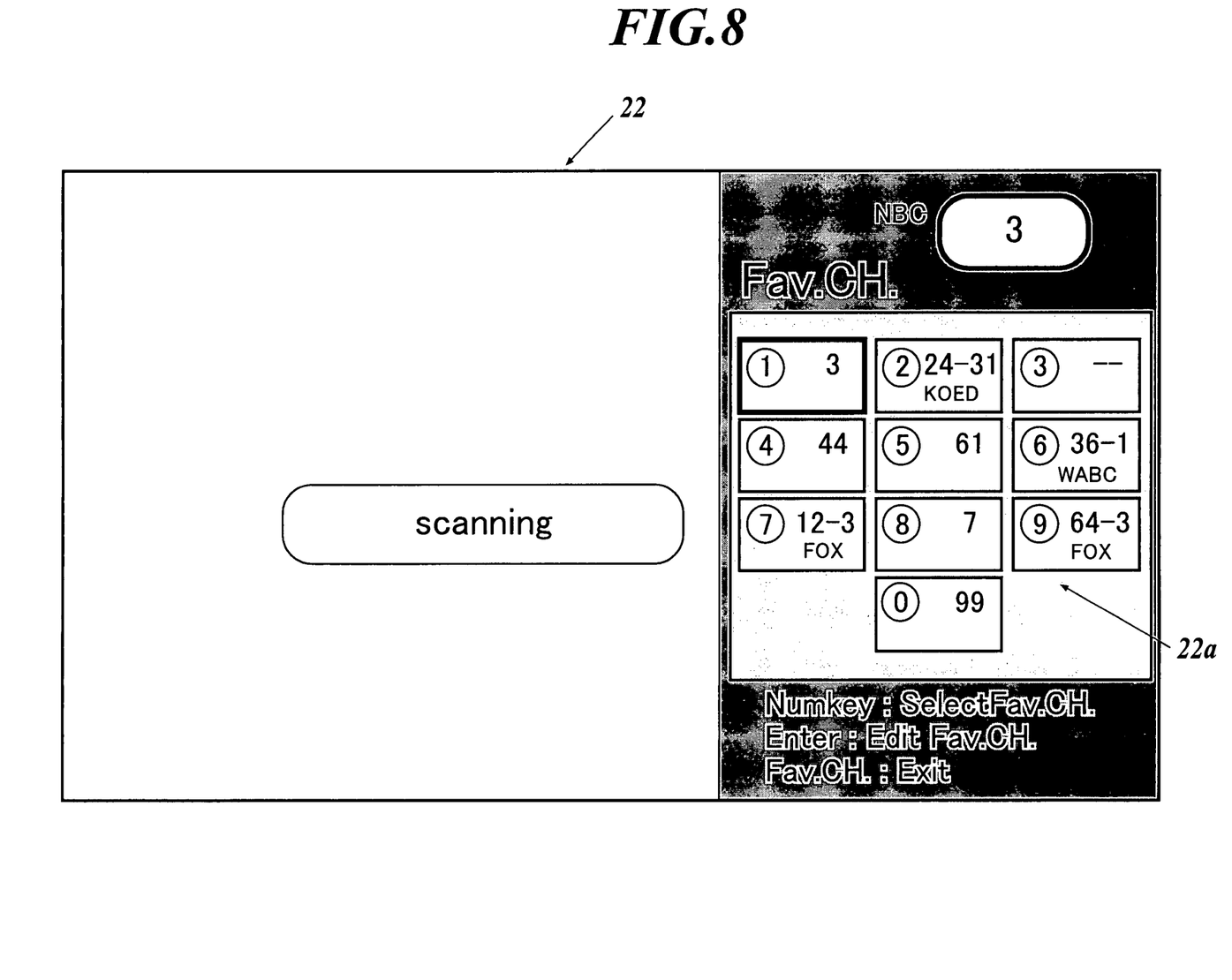
FIG. 8 is an explanatory view showing one example of a display screen in an image display unit of a display device.
Figure 9:
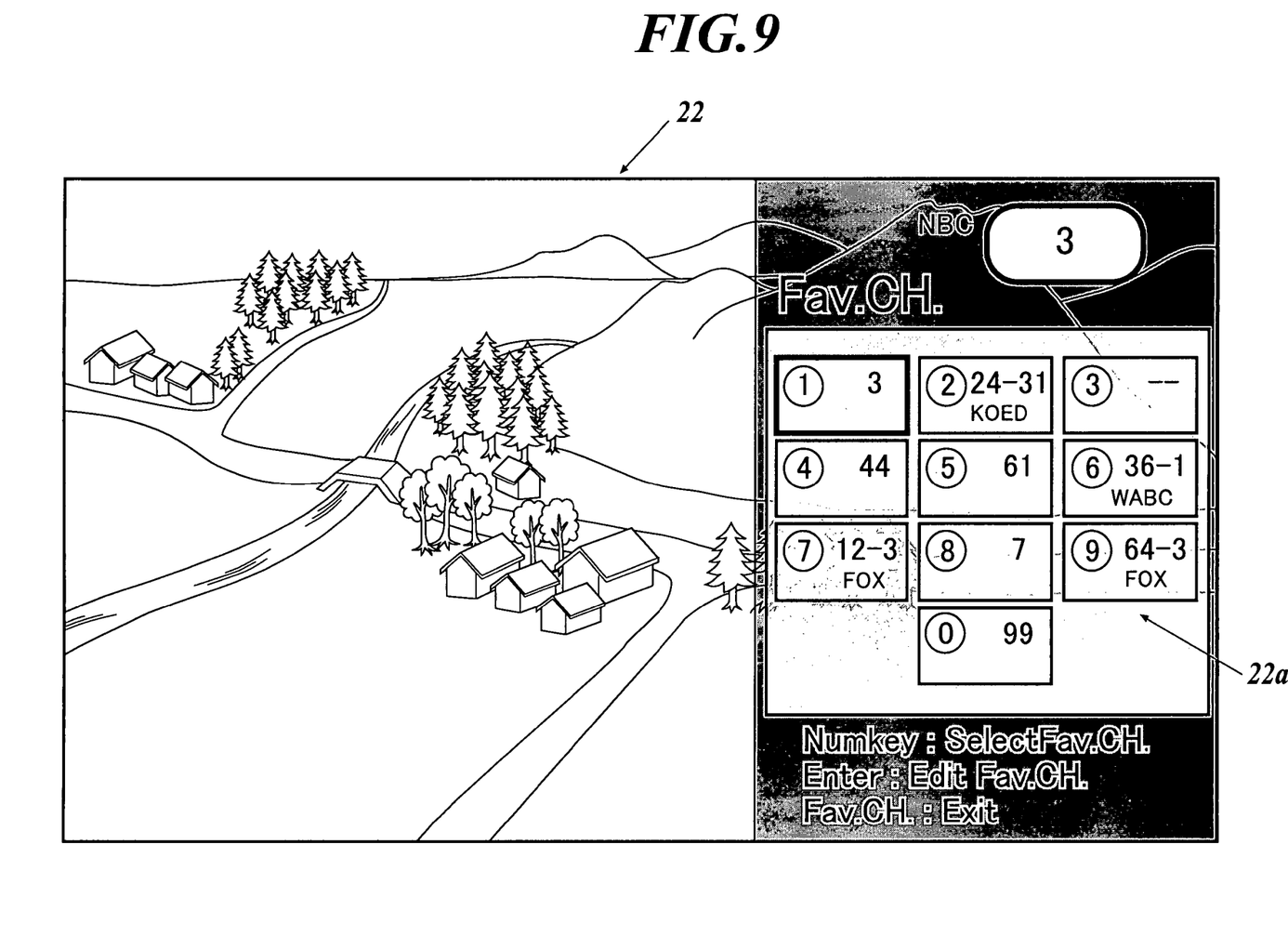
FIG. 9 is an explanatory view showing one example of a display screen in an image display unit of a display device.

For example, when "1" of the ten key 32 on the remote controller 30 is depressed, the controller 7 scans a broadcast signal of the channel number "3" made to correspond to "1" of the ten key 32 (see FIG. 8) and switches the broadcasting of the broadcast program to that based on the broadcast signal of the channel number "3" (see FIG. 9).

Figure 10:
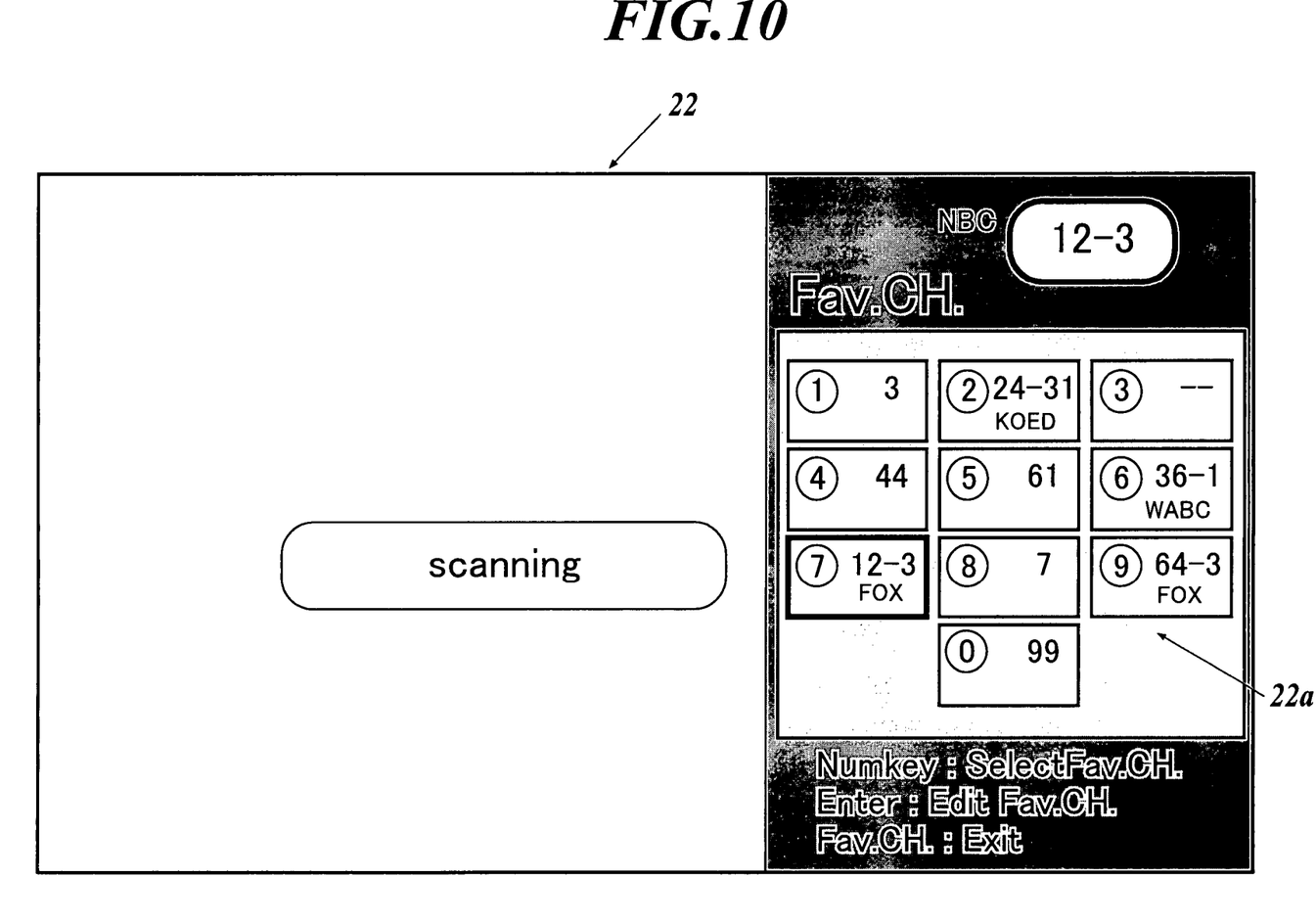
FIG. 10 is an explanatory view showing one example of a display screen in an image display unit of a display device.
Figure 11:
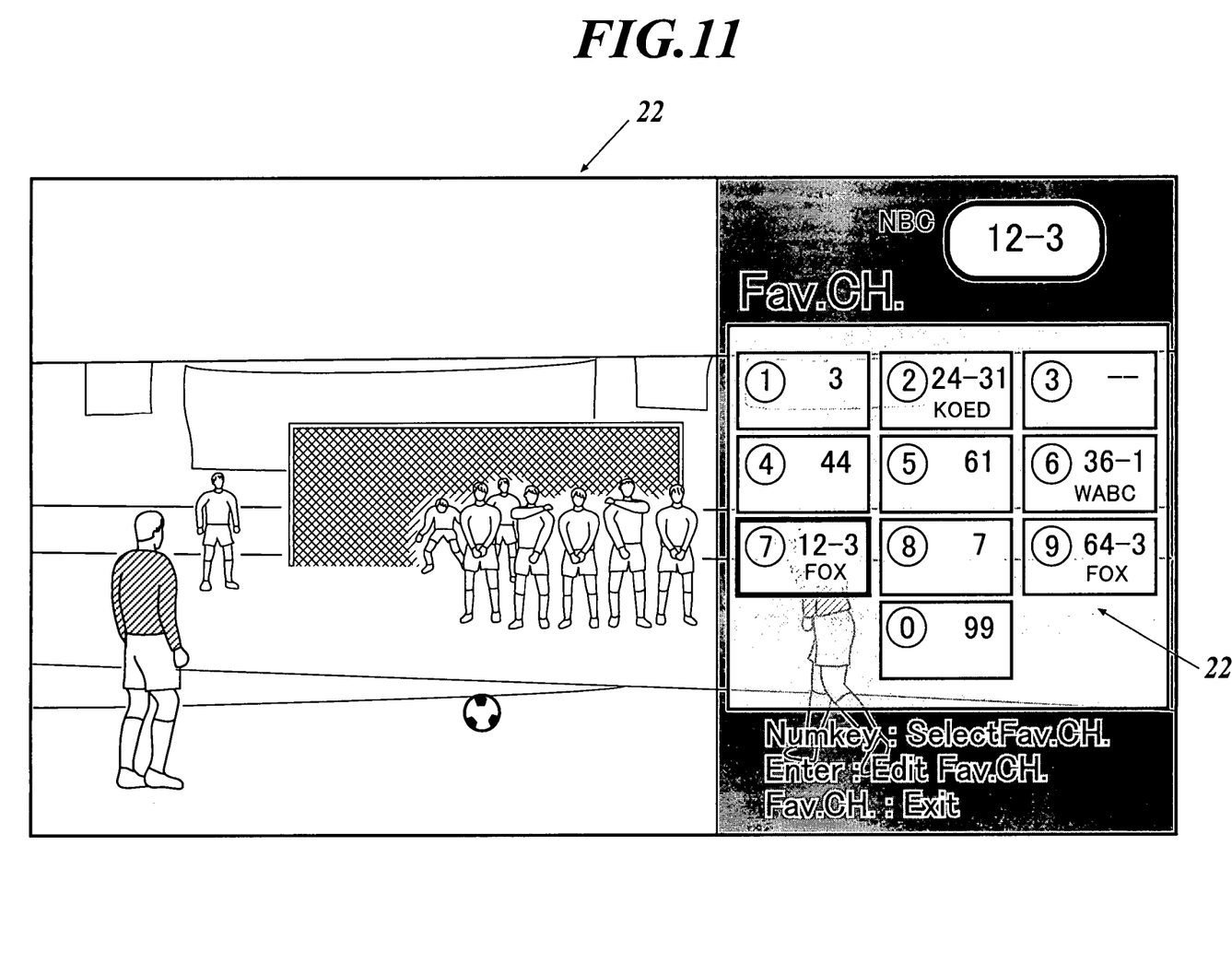
FIG. 11 is an explanatory view showing one example of a display screen in an image display unit of a display device.

After switching the channels or broadcast programs, the channel number-related OSD display 22a continues to be displayed on the image display unit 22 of the display device 20. Therefore, when the switched broadcast program is not a desired program, the channel switching operation can be easily performed continuously by reference to the OSD display 22a. For example, when "7" of the ten key 32 on the remote controller 30 is depressed during the broadcasting of the broadcast program shown in FIG. 9, the controller 7 scans a broadcast signal of the channel number "12-3" made to correspond to "7" of the ten key 32 (see FIG. 10) and switches the broadcasting of the broadcast program to that based on the broadcast signal of the channel number "12-3" (see FIG. 11).

On the other hand, when determining that the ten key 32 is not depressed and the channel switching instruction is not inputted (step S205; No), the controller 7 determines whether or not the display deletion timer t for the OSD display reaches a predetermined time T (e.g., 10 seconds) (step S207).

When the controller 7 determines that the display deletion timer t for the OSD display reaches the predetermined time T (step S207; Yes), the processing proceeds to step S209.

On the other hand, when determining that the display deletion timer t for the OSD display does not reach the predetermined time T (step S207; No), the controller 7 determines whether or not the favorite program key (Fav. key) 33 on the remote controller 30 is depressed (step S208).

When the controller 7 determines that the favorite program key (Fav. key) 33 on the remote controller 30 is not depressed (step S208; No), the processing returns to step S204.

On the other hand, When determining that the favorite program key (Fav. key) 33 on the remote controller 30 is depressed (step S208; Yes), the controller 7 deletes the channel number-related OSD display 22a displayed on the image display unit 22 of the display device 20 (step S209) and the processing returns to step S201.

As described above, in the broadcasting receiver 100 according to the present invention, the channel number-related OSD display 22a displayed on the image display unit 22 of the display device 20 can be confirmed and at the same time, a favorite channel (broadcast program) allocated to and registered on the ten key 32 can be selected and therefore, a desired broadcast program can be easily selected.

Further, for a predetermined time after switching the channels (broadcast programs), the channel number-related OSD display 22a continues to be displayed on the image display unit 22 of the display device 20 and therefore, the channel switching operation can be easily performed continuously by reference to the OSD display 22a.

In the above-described embodiment, when obtaining a plurality of the virtual channels in which any one of main channel numbers and sub-channel numbers is different, a virtual channel having the minimum value in the obtained virtual channels is updated as a new virtual channel; however, the present invention is not limited thereto. For example, a virtual channel having the maximum value may be updated as a new virtual channel, or a virtual channel having a main channel number or sub-channel number which remains the same as that stored in the channel storage unit may be updated as a new virtual channel.

In addition, other specific detailed configurations can be, of course, appropriately changed.

The entire disclosure of Japanese Patent Application No. 2005-179442 filed on Jun. 20, 2005, including description, claims, drawings and summary are incorporated herein by reference.

What is claimed is:

1. A broadcasting receiver comprising:

a receiver to receive a broadcast signal of a broadcast program;

a broadcast program output unit to broadcast a broadcast program in response to the broadcast signal received by the receiver;

a channel storage unit to store a physical channel correlated to a first virtual channel, the first virtual channel being composed of a first main channel number to specify a broadcast signal of a predetermined broadcast program and a first sub-channel number to perform multiple delivery of broadcast signals of broadcast programs having different broadcast contents each other, the physical channel corresponding to a frequency band of the broadcast signal of the broadcast program;

a virtual channel acquisition unit to acquire a second virtual channel from the broadcast signal which is correlated to the physical channel and is received by the receiver, the second virtual channel being composed of a second main channel number and a second sub-channel number;

a virtual channel comparison unit to compare the first virtual channel correlated to the physical channel with the second virtual channel to judge whether or not the first virtual channel and the second virtual channel are the same virtual channel;

a storage control unit to allow the channel storage unit to store the second main channel number in replacement of the first main channel number, when the virtual channel comparison unit judges that the first virtual channel and the second virtual channel are not the same virtual channel and judges that the second sub-channel number is the same as the first sub-channel number and the second main channel number is different from the second main channel number;

a channel selection device including a channel key corresponding to the physical channel, to switch the physical channel so that the broadcast program output unit broadcasts a broadcast program corresponding the first virtual channel correlated to the physical channel when the channel key is operated;

a channel display control unit to allow the broadcast program output unit to display a channel number indicating the first virtual channel of the channel key in an arrangement corresponding to an arrangement of the channel key on the channel selection device;

a display deletion control unit to delete the channel number displayed on the broadcast program output unit by the channel display control unit when a predetermined time is lapse; and a display extension control unit to extend a display time of the channel number for a predetermined time, when the channel key is operated while the channel number is displayed on the broadcast program output unit.

2. The broadcasting receiver according to claim 1, wherein the arrangement in which the channel number indicating the first virtual channel of the channel key is displayed comprises an on-screen display.

3. A broadcasting receiver comprising:

a receiver to receive a broadcast signal of a broadcast program;

a broadcast program output unit to broadcast a broadcast program in response to the broadcast signal received by the receiver;

a channel storage unit to store a physical channel correlated to a first virtual channel, the first virtual channel being composed of a first main channel number to specify a broadcast signal of a predetermined broadcast program and a first sub-channel number to perform multiple delivery of broadcast signals of broadcast programs having different broadcast contents each other, the physical channel corresponding to a frequency band of the broadcast signal of the broadcast program;

a virtual channel acquisition unit to acquire a second virtual channel from the broadcast signal which is correlated to the physical channel and is received by the receiver, the second virtual channel being composed of a second main channel number and a second sub-channel number;

a virtual channel comparison unit to compare the first virtual channel correlated to the physical channel with the second virtual channel to judge whether or not the first virtual channel and the second virtual channel are the same virtual channel;

a storage control unit to allow the channel storage unit to update the first virtual channel by storing the second virtual channel in replacement of the first virtual channel, when the virtual channel comparison unit judges that the first virtual channel and the second virtual channel are not the same virtual channel and judges that one of the first and second main channel numbers and the first and second sub-channel numbers are different from each other;

a channel selection device including a channel key corresponding to the physical channel, to switch the physical channel so that the broadcast program output unit broadcasts a broadcast program corresponding the first virtual channel correlated to the physical channel when the channel key is operated; and a channel display control unit to allow the broadcast program output unit to display a channel number indicating the first virtual channel of the channel key in an arrangement corresponding to an arrangement of the channel key on the channel selection device.

4. The broadcasting receiver according to claim 3, further comprising:

a display deletion control unit to delete the channel number displayed on the broadcast program output unit by the channel display control unit when a predetermined time is lapse; and a display extension control unit to extend a display time of the channel number for a predetermined time, when the channel key is operated while the channel number is displayed on the broadcast program output unit.

5. The broadcasting receiver according to claim 2, wherein the arrangement in which the channel number indicating the first virtual channel of the channel key is displayed comprises an on-screen display.

* * * * *